US008732673B2

(12) United States Patent
Finking et al.

(10) Patent No.: US 8,732,673 B2
(45) Date of Patent: May 20, 2014

(54) AUTOMATED DEBUGGING SYSTEM AND METHOD

(75) Inventors: Robert Finking, Southampton (GB); Simon Roberts, Romsey (GB); Graham Hewson, Poole (GB)

(73) Assignee: ITI Scotland Limited, Scotland (GB)

( * ) Notice: Subject to any disclaimer, the term of this patent is extended or adjusted under 35 U.S.C. 154(b) by 65 days.

(21) Appl. No.: 13/323,424

(22) Filed: Dec. 12, 2011

(65) Prior Publication Data

US 2012/0151453 A1 Jun. 14, 2012

Related U.S. Application Data

(63) Continuation of application No. PCT/GB2010/001517, filed on Aug. 10, 2010.

(30) Foreign Application Priority Data

Jun. 10, 2009 (EP) .................................... 09251528

(51) Int. Cl.
G06F 9/44 (2006.01)
(52) U.S. Cl.
USPC ............................. 717/130; 717/126; 717/129
(58) Field of Classification Search
USPC .................................................. 717/124–139
See application file for complete search history.

(56) References Cited

U.S. PATENT DOCUMENTS

| 5,265,254 A * | 11/1993 | Blasciak et al. | 717/130 |
| 5,909,577 A * | 6/1999 | Devanbu | 717/127 |
| 6,311,327 B1 | 10/2001 | O'Brien et al. | |
| 8,250,553 B2 * | 8/2012 | Gellerich | 717/155 |
| 8,387,022 B2 * | 2/2013 | Horning et al. | 717/127 |
| 2003/0061600 A1 * | 3/2003 | Bates et al. | 717/133 |
| 2004/0003375 A1 * | 1/2004 | George et al. | 717/124 |
| 2008/0301502 A1 | 12/2008 | Harsha et al. | |

FOREIGN PATENT DOCUMENTS

EP 0678810 10/1995

OTHER PUBLICATIONS

"Run-length encoding" published Aug. 19, 2008. 3 pages. http://web.archive.org/web/20080819202221/http://en.wikipedia.org/wiki/Run-length_encoding.*

Agrawal, Hiralal. Towards automatic debugging of computer programs. Diss. Purdue University, 1991, pp. 1-194.*

(Continued)

Primary Examiner — Satish Rampuria
(74) Attorney, Agent, or Firm — Leason Ellis LLP

(57) ABSTRACT

System and method for automatically identifying a source of a run-time error in a computer system comprises a static analysis system (SAS), an instrumentation system (IS) and a post-execution analysis system (PEAS). The is arranged to generate static analysis data on computer program code (CPC) for the computer system, including information on possible behaviors of the CPC when executed. The IS is arranged to instrument the CPC by inserting marker triggers into the CPC that, generate a marker associated with each of a number of predetermined points in the CPC that would be reached during execution of the CPC. Each marker is, uniquely identifiable. The predetermined points are determined in dependence on the static analysis data. The PEAS-post execution analysis system is arranged to processes data on a run-time error produced by execution of the instrumented CPC, wherein the generated markers and the static analysis data to identify the source of the run-time error.

12 Claims, 9 Drawing Sheets

(56) References Cited

OTHER PUBLICATIONS

Auguston, Mikhail, Clinton Jeffery, and Scott Underwood. "A framework for automatic debugging." Automated Software Engineering, 2002. Proceedings. ASE 2002. 17th IEEE International Conference on. IEEE, 2002, pp. 1-6.*

Mayer, Wolfgang, and Markus Stumptner. "Extending diagnosis to debug programs with exceptions." Automated Software Engineering, 2003. Proceedings. 18th IEEE International Conference on. IEEE, 2003, pp. 1-5.*

Ball T et al: "optimally profiling and tracing programs" ACM Transactions on Programming Languages and Systems, New York, NY, US, vol. 16, No. 4, Jul. 1, 1994, pp. 59-64,67, XP002226243 the whole document.

Knupfer A et al: "Construction and Compression of Complete Call Graphs for Post-Mortem Program Trace Analysis" Parallel Processing, 2005. ICPP 2005. International Conference on Oslo, Norway Jun. 14-17, 2005, Piscataway, NJ, USA,IEEE, Jun. 14, 2005, pp. 165-172, XPOI0820883 ISBN: 978-0-7695-2380-4 the whole document.

* cited by examiner

Fig. 2

```
1 #include <stdio.h>
2 #include <stdlib.h>
3
4
5 void fn1(int *iptr)
6 {
7
8    *iptr = 5;
9 }
10
11 void fn2(int * iptr)
12 {
13   fn1(iptr);
14 }
15
16 int * fn3()
17 {
18   printf("got here\n");
19   return NULL;
20 }
21
22 void fn4(int * iptr)
23 {
24   printf("fn4 got here\n");
25   fn2(iptr);
26 }
27
28
29 int main(int argc, char *argv[])
30 {
31   int *iptr;
32
33   iptr = fn3();
34   fn4(iptr);
35   return 0;
36 }
```

Fig. 3

```
Program received signal SIGSEGV, Segmentation fault.
0x00401056 in fn1 (iptr=0x0) at t.c:8
8       *iptr = 5;
#0  0x00401056 in fn1 (iptr=0x0) at t.c:8
#1  0x0040106f in fn2 (iptr=0x0) at t.c:13
#2  0x004010a7 in fn4 (iptr=0x0) at t.c:25
#3  0x004010e6 in main (argc=1, argv=0x6125c0) at t.c:34
```

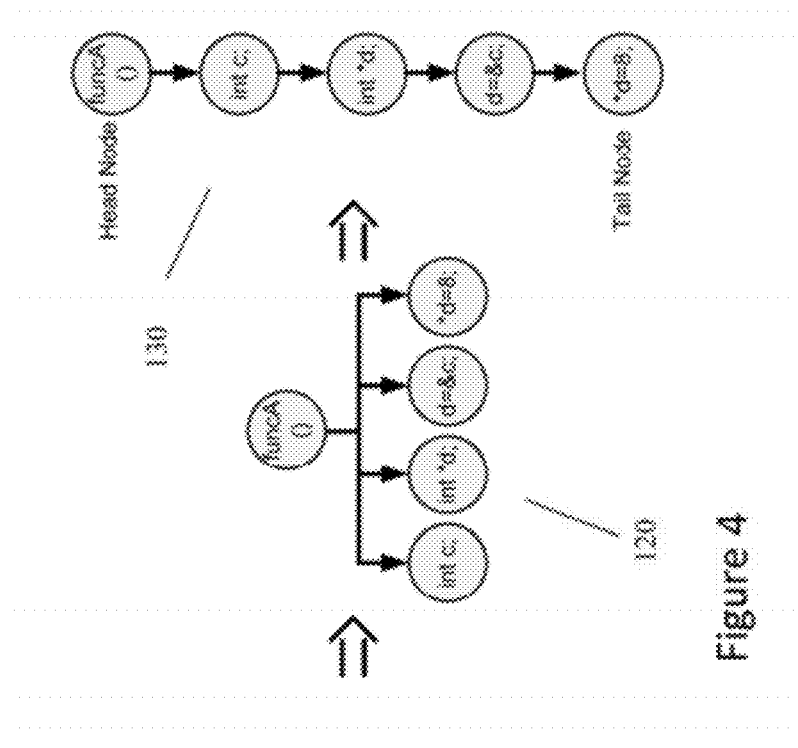
Figure 4
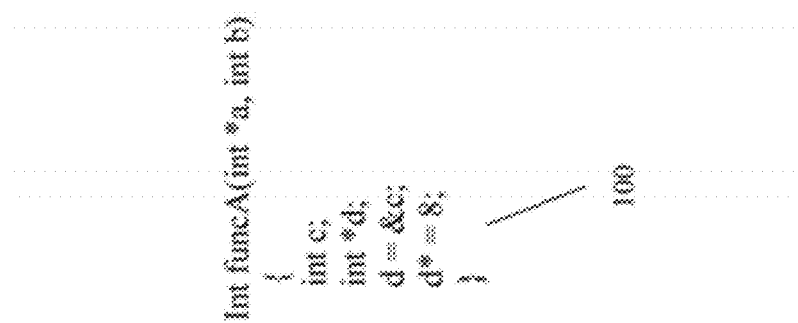

Figure 5

```
1 #define _NO_STDIO
2
3 #ifdef _NO_STDIO
4 #  define NULL 0
5 #  define true 1
6 #  define false 0
7 #endif
8
9 int main(void) {
10    int a = 99, y=100, nb, *p_a, *p_b, *p_x,  *p_abc;
11
12     nb = *p_abc;
13
14    /* Allocate some memory to p_a */
15    p_a = (int*) malloc(sizeof(int));
16    p_x = (int*) malloc(sizeof(int));
17
18
19    if (p_a != NULL) {
20       *p_a = a;
21       *p_x = y;
22       p_b = p_a;
23
24       /* Valid dereference of p_b pointer */
25       printf ("*p_b = %d\n", *p_b);
26
27
28          if (true == false)
29          {
30              printf ("Something\n");
31          }
32
33          else
34          {
35              printf ("Something else\n");
36          }
37
38
39       /* free memory allocated to p_a */
40       free(p_a);
41
42
43       printf ("*p_b = %d \n", *p_b, *p_x);
44    }
45
46 return (0);
47 }
```

```
RTU: Parse source code...
RTU: Parsing complete.
RTU: Generate flow graph...
RTU: Flow graph complete.
RTU: Perform static analysis and store state information ...
RTU: Static analysis complete.
RTU: Compile regenerated code...
RTU: Compile regenerated code complete.
RTU: Valgrind the regenerated code
VGU: Valgrind error: 'Bad memory reference'
RTU: Valgrind analysis complete.
RTU: We think the symptom is on _original_ line: 43 which is
regenerated code line number: 55
RTU: ### There is likely to a problem on line 40 ###
RTU: -- *p_b goes from 'Good Heap' to 'Bad Heap'
RTU: ### There could be an additional problem on line 22 ###
RTU: -- *p_b goes from "UI" to 'Good Heap'
RTU: ### There could be an additional problem on line 16 ###
RTU: -- *p_x goes from "UI" to 'Good Heap'
RTU: Finished processing.
```

AUTOMATED DEBUGGING SYSTEM AND METHOD

CROSS REFERENCE TO RELATED APPLICATIONS

This application is a continuation under 35 U.S.C. §120 of International PCT Patent Application No. PCT/GB20101/001517, filed on Aug. 10, 2010, which claims the benefit of European Application Serial No. 09251528.7, filed Jun. 10, 2009, which are hereby incorporated by reference in their entirety herein.

FIELD OF THE INVENTION

The present invention related to a debugging system and method that is particularly applicable for use in debugging run-time errors in computer program code.

BACKGROUND TO THE INVENTION

In the ideal world, a system will be created correctly on its first iteration without mistakes and cater for all eventualities. In the real world, mistakes and unexpected events happen.

This is certainly the case in computer software. It is not unusual in complex systems for components and routines to be written or created by different individuals or organisations. Indeed, it is not at all unusual to inherit what is termed 'legacy' code as part of a project; company buy-out; or merger that you are expected to support and continue to refine even though you had no input in its design or implementation.

Debugging is a problem faced by developers worldwide. They have a problem in their code. They have pinpointed the outward manifestation of the problem, using a dynamic analysis tool, but they have no clue as to the root cause. The debugging to find the root cause of the problem (necessary to effect a fix) is often long and protracted. On large poorly maintained code bases the debug time can run into weeks. Debugging techniques often rely heavily on manual insertion of trace statements to show exactly what the code is doing.

Many compilers and software development systems offer assistance to a developer as software is being written to attempt to identify syntactic errors at design-time. This is generally referred to as static analysis. However, once a project reaches a stage where code is compiled and run, the help available diminishes significantly. At this stage, dynamic testing typically takes the place of static testing techniques.

Dynamic testing (or dynamic analysis) is a term used in software engineering to describe the testing of the dynamic behaviour of code. That is, dynamic analysis refers to the examination of the physical response from the system to variables that are not constant and change with time. In dynamic testing the software must actually be compiled and run. An error (either an exception or a spurious result) that arises at this stage is referred to as a run-time error. An exception, if handled properly in code may not even be seen by a user and may simply be logged or stepped over. However in the worst case the program may fail or even cause the whole operating system to become unstable or reboot. Spurious results may not in themselves result in program termination (although it will be appreciated that if relied upon they may cause termination at some later point). Typically a spurious error is an errors in logic, arithmetic or the like that causes an unexpected result (such as 1+1 equalling 5).

Unit Tests, Integration Tests, System Tests and Acceptance Tests are a few of the existing dynamic testing methodologies. Dynamic testing typically means testing based on specific test cases by execution of the test object or running programs.

It is not unusual for a run-time error to be missed by the test cases used in dynamic testing. Unless the developer has had the foresight to place error handling routines in code, a run-time error is often simply presented to a user as an obscure operating system level error with a memory reference that takes considerable expertise and time to identify its cause.

When a run-time error is encountered and is not easily identified, a common approach is to step through the code in a debugging environment to attempt to identify where the error occurred.

One semi-automated approach to this is called execution tracing. In execution tracing, tracing statements are added to the original code that logs the progress of execution through the code. For example, there may be a trace statement at the start of each routine and another at each branch in code. Each tracing statement writes data to a log as it is encountered in the code.

After the code has run, the log can be examined to identify the path traversed and give the developer more of an insight into where the code failed.

Execution tracing is a technique employed both as a debugging tool and also as a method of calculating the effectiveness of software tests (coverage analysis).

In order to provide an effective execution trace, existing techniques rely on fairly large amounts of information being recorded at trace points in order to allow the end user to observe whereabouts in the software the execution path went.

Given the size of a code base for a typical project or system, tracing is generally not feasible for a whole system and must be applied in a piecemeal fashion. Even then, the magnitude of logged data from tracing even selected modules can be significant and impair effective analysis of the problem. Full path tracing produces large amounts of output data, limiting the size of execution to which it can be applied.

While it is possible to reduce the amount of logged data by profiling techniques and code coverage techniques, these reduce the volume of output by recording summary information only. This is disadvantageous as the summary information gives only a vague idea of the area of a problem and also omits information on the full path traversed.

Statement of the Invention

According to an aspect of the present invention, there is provided a debugging system for automatically identifying a source of a run-time error in a computer system, the debugging system comprising a static analysis system, an instrumentation system and a post-execution analysis system, wherein the static analysis system is arranged to generate static analysis data on computer program code for the computer system, the static analysis data including information on possible behaviours of the computer program code when executed, the instrumentation system being arranged to instrument the computer program code by inserting one or more marker triggers into the computer program code, the or each marker trigger being arranged to generate a marker associated with each of a number of predetermined points in the computer program code that would be reached during execution of the computer program code, each marker being uniquely identifiable and the points being determined in dependence on the static analysis data, the post execution analysis system being arranged to process data on a run-time error produced by execution of said instrumented computer program code, the generated markers and the static analysis data to identify the source of the run-time error.

Preferably, the static analysis system is arranged to generate a control flow graph for the computer program code, the static analysis data including the control flow graph and mapping data mapping nodes of the control flow graph to its associated line of the computer program code.

Preferably, the instrumentation system is arranged to generate the instrumented computer program code from the control flow graph.

A predetermined point may comprise a branch in the path of the computer program code. A branch may include a function call.

The or each marker may comprises a code selected to uniquely differentiate the branch from other branches.

Preferably, the or each marker comprises a binary code.

The instrumentation system may be optionally arranged to generate the binary code for each marker in dependence on a compression scheme determined from the static analysis data.

The instrumentation system may be arranged to length encode the binary codes for markers within loops in the computer program code. Optionally, the length encoding scheme may be run length encoding, although it will be appreciated that other encoding schemes are also applicable.

According to another aspect of the present invention, there is provided a debugging system for automatically identifying a path traversed through a computer program during execution, the debugging system comprising a static analysis system, an instrumentation system and a post-execution analysis system, wherein the static analysis system is arranged to generate static analysis data on the computer program code for the computer system, the static analysis data including information on possible behaviours of the computer program code when executed, the instrumentation system being arranged to instrument the computer program code by inserting one or more marker triggers into the computer program code, the marker triggers being arranged to output a marker for the path followed at each branch point in the computer program code that would be reached during execution of the computer program code, the or each marker being uniquely identifiable and the branch points being determined in dependence on the static analysis data, wherein upon execution the instrumented computer program code being arranged to output a trail of markers generated from encountered marker triggers and identifying the path traversed.

According to another aspect of the present invention, there is provided a computer implemented method of automatically debugging computer program code comprising: generating static analysis data on computer program code for the computer system, the static analysis data including information on possible behaviours of the computer program code when executed;
instrumenting the computer program code by inserting one or more marker triggers into the computer program code, the or each marker trigger being arranged to generate a marker associated with each of a number of predetermined points in the computer program code that would be reached during execution of the computer program code, each marker being uniquely identifiable and the points being determined in dependence on the static analysis data; and, processing data on a run-time error produced by execution of said instrumented computer program code, the generated markers and the static analysis data to identify the source of the run-time error.

The step of generating static analysis data preferably includes generating a control flow graph for the computer program code and mapping data mapping nodes of the control flow graph to its associated line of the computer program code.

The step of instrumenting preferably includes generating the instrumented computer program code from the control flow graph.

Preferably, the or each marker comprises a unqiue binary code.

The method may further comprise generating the binary code for each marker in dependence on a compression scheme determined from the static analysis data.

The step of determining the compression scheme may includes the steps of:
  examining each branch point in the control flow graph to identify leaf points, a leaf point comprising a branch point which contain no further branches beneath them;
  for each leaf point, identifying the number of branches;
  for each leaf branch point, identifying the parent branch points within the control flow graph which must be traversed in order to reach that leaf branch point;
  calculating a minimum marker size in dependence on the number of leaf point and parent branches, the minimum marker size comprising the corresponding number of bits needed to record which branch has been taken;
wherein the step of instrumenting comprises:
  assigning a unique binary code marker to each leaf point and parent branch, the binary code marker being of the calculated minimum marker size.

The method may further comprise length encoding the binary codes for loops within the computer program code.

The step of processing data on a run-time error may further comprise:
  using the data on the run-time error in combination with the mapping data to identify the node in the control flow graph corresponding to the point at which the run-time error occurred;
  building, from the static analysis data, a record of variables and their states which are associated with the identified node;
  traversing up the control flow graph to the head node including at each node traversed:
    comparing, using the record of variables and states and the static analysis data, states of the variables in the record with the states of the respective variables at the current node; and,
  updating the record for the variable and flagging a change to the variable if the variable state at the current node differs from the variable state in the record, wherein if the current node branches up the control flow graph in two or more directions, the method further comprising determining the branch to traverse in dependence on the generated markers.

The method may further comprise identifying the line in the computer program code corresponding to the source of the run-time error and flagging the line and data on the error for correction.

Preferred embodiments of the present invention are implemented in computer program code. The computer program code may be software, firmware, hardware or some combination thereof.

Embodiments of the present invention are directed to an automated system and method of debugging in which static analysis information is combined with execution tracing to reduce the amount of information that needs to be recorded dynamically (at run time). Because static analysis can determine detailed information about how a system can and can't behave, the amount of information recorded can be reduced. There are three aspects to this.

Firstly, at the most efficient level, only decision points need to be instrumented. Because the static analysis can logically deduce function calls they do not need to be recorded, vastly reducing the number of trace instrumentations needed, to those at branch points only. Modern software systems contain a lot of "plumbing" and not so much algorithmic code. As such, many functions have no decision points in them at all. Such functions can remain entirely un-instrumented.

Secondly, because the possible code paths the system may follow are deducible by static analysis it is only necessary to record enough information to differentiate between branches. In the case of the most common form of branch, the IF statement, this means recording an optimally small amount (possibly as small as a single bit) of trace information instead of logging an identifier which uniquely identifies that point in the code, or worse a textual description of it.

Finally, because the structure of the code is known by the static analysis engine, efficient compression techniques are possible, which are tailored to the particular code being traced. As a result, embodiments of the present invention combine traditional run-time debugging approaches with static analysis to vastly reduce the amount of output data produced and accurately determine the cause of failure rather than just the point of failure. The trace marker records can be optimally small. This technique effectively automates the tracing process in a way that is understandable to a static analysis engine. The result being that the whole process can be carried out automatically and vastly reduces the time taken to find the root cause of a run-time problem.

A further advantage is that because the tracing data produced is minimised, much larger execution runs can be recorded than in prior systems. Execution speed of instrumented code (and therefore production of a debugging report) is observed to be much better than with existing techniques due to both reduced number of trace statements and reduced amount of data recorded per statement. Another advantage is that historical traces can be kept for longer due to the limited overhead needed to retain the compact trace files.

Embodiments of the present invention use interaction between static and dynamic analysis to, amongst others:
- identify the exact root cause (down to a specific line number and variable) of dynamic analysis failures;
- use a marker trail generated at runtime to limit the post analysis search space; focus testing on relevant items—variables and multi statement lines are factored out by the static modelling of the code.

BRIEF DESCRIPTION OF THE DRAWINGS

Embodiments of the present invention will now be described in detail, by way of example only, with reference to the accompanying drawings in which:

FIGS. 2 and 3 are respective illustrations of code containing an error and an error report produced in conventional systems;

FIG. 4 is an illustration of transformation of computer program code into an abstract syntax tree and control flow graph for use in embodiments of the present invention;

FIG. 5 is an illustration of original code and regenerated code including marker triggers;

FIGS. 7 and 8 are, respectively, example code including an error that occurs at run-time and the output from one embodiment of the present invention identifying the source of the error; and, FIG. 9 is a schematic diagram of a debugging system according to another embodiment of the present invention.

DETAILED DESCRIPTION

Figure 1:
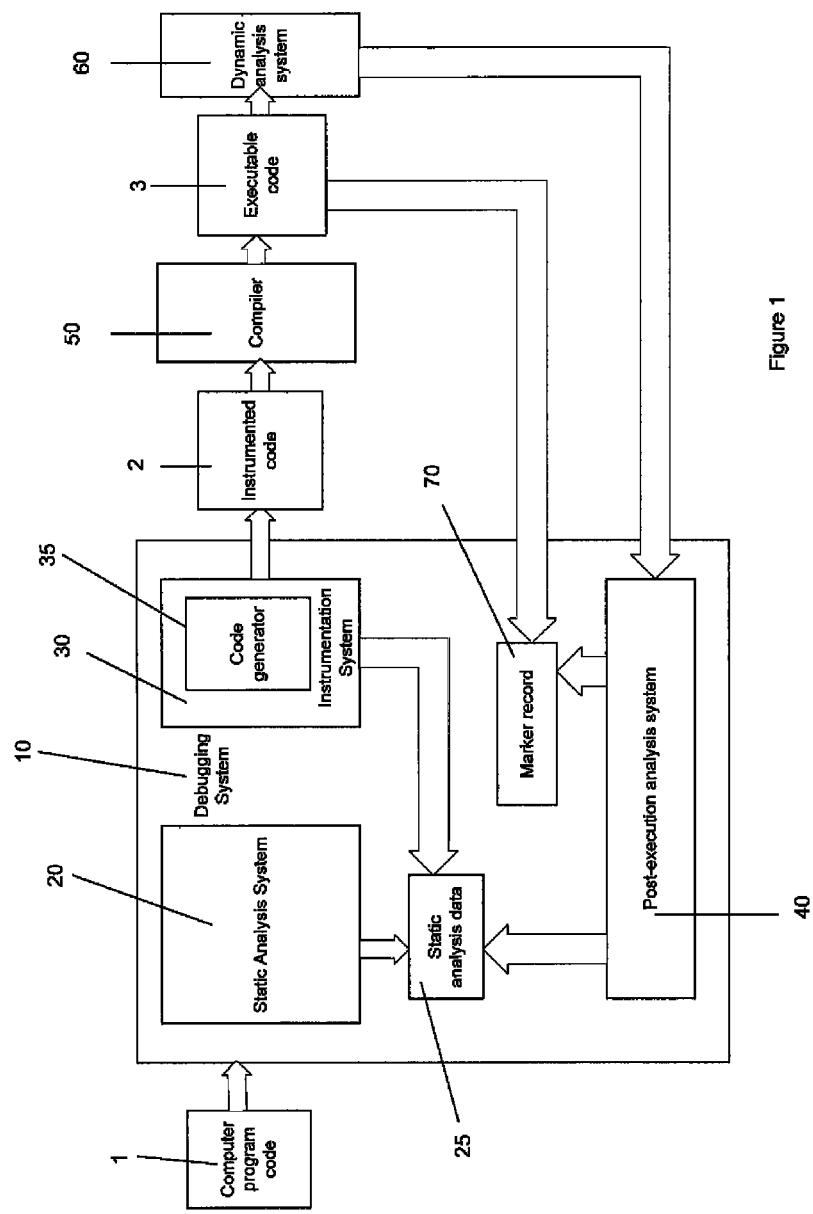
FIG. 1 is a schematic diagram of a debugging system according to an embodiment of the present invention.

FIG. 1 is a schematic diagram of a debugging system according to an embodiment of the present invention.

The debugging system 10 includes a static analysis system 20, an instrumentation system 30 and a post-execution analysis system 40.

In use, the debugging system performs static analysis on computer program code 1 prior to compilation to generate static analysis data 25. Dependent on the static analysis data 25, the code is instrumented by the instrumentation system 30. The instrumented code 2 includes triggers for markers to be generated when a predetermined point in the code is reached during execution. The markers are uniquely labelled and the associated triggers are inserted by the instrumentation system 30 at points in the code determined from the static analysis data 25.

At execution time, the instrumented code 2 behaves in exactly the same way as the un-instrumented code 1, except for the fact that it records which parts of the software are executing and in what order in a marker record 70.

While it will typically be source code that is instrumented, it will be appreciated that it could also be object code.

The debugging system 10 interfaces with a compiler 50 for compilation of the instrumented code 2 into executable code 3. The executable code 3 is then preferably executed in a dynamic analysis system 60. During execution, the marker record 70 is created by the marker code to record the execution path through the code.

The post-execution analysis system 40 is arranged to interface with the dynamic analysis system 60 and is operative to process the results of the dynamic analysis system 60 in conjunction with the marker record 70 and the static analysis data 25 to identify errors encountered.

It is usual to find that runtime errors are accompanied by at least some sort of diagnostic output, for example, if you have some program code like the listing shown in FIG. 2 and you run it in a debugger, you may get a stack back trace something like that shown in FIG. 3.

However this only shows you path back up the stack, which is an instantaneous snapshot of the program state. It gives you no information about how it got into that state. In particular there is no clue as to the fact that f3 has been called (which is the real cause of the NULL in the first place).

One of the major strengths of embodiments of the present invention is that much more specific information about the direct cause of a failing program can be generated because we know the execution path. One example of how this is obtained and used during post-execution analysis is discussed below.

Static Analysis

In one embodiment of the present invention, a control flow graph is used in conjunction with an abstract syntax tree to statically analyse code in the static analysis system 20.

Control flow graph information is extracted from the source code by first lexing and parsing the code and building an abstract syntax tree (AST). In one embodiment, a python version of the parser generator tools Lex and Yacc is used. The resulting parser is then used to build the AST, from which the control flow graph is extracted. FIG. 4 illustrates a simple code segment 100 transformed into an AST representation 120 and then to a control flow graph 130.

Embodiments of the present invention are illustrated with respect to ANSI C, whose definition is widely available. However, embodiments are equally applicable to languages such as Java/C/C++/C#—in each case a separate parser would be needed.

Each function in the original code is represented by a control flow graph. A control flow graph comprises a series of nodes, each of which represent one statement of the original C code. Each node actually contains a reference to the AST statement which it represents, so that any changes made to an AST statement are automatically reflected in the control flow graph.

The function definition becomes the head of the control flow graph, and the last statement becomes the tail. There are three types of control flow graph node used to make up the control flow graph. These are:

BaseNode
- The BaseNode is used in the control flow graph to represent all statements which don't affect the flow of the code. These include variable declarations, variable assignments, function calls and function definitions.
- The BaseNode class has a getHeadNode method which retrieves the head node—this is done by recursively calling the function on the last Node reference until the last node reference doesn't exist. A getTailNode method is also defined which does the same thing to find the tail node of the control flow graph.
- The base node class contains a dictionary which is used to keep a register of all the node objects. Whenever a node object is created, a reference to it is stored in the register against a unique node id. This register is used to allow searches through all nodes. For example, a search function searches through the node register for nodes that have a specific line-number associated with them. Another search function may return the tail node of a given function from its function name. This is done by searching for the function definition node by name and then requesting its tail node.

BranchNode
- The BranchNode inherits from BaseNode, and represents statements which change the flow of the code. For example IF statements, for and do loops are all represented using BranchNodes.
- The BranchNode contains an expression, and the next node is chosen based on the result of the expression. There are therefore two references to next nodes—a next node reference for the true branch and a next node reference for the false branch.

MuxNode
- The MuxNode also inherits from BaseNode. It is used to represent the combining of two branches after a branch node has been used to split the flow.
- The MuxNode doesn't represent any statements in the AST, but is given a no-operation statement for consistency with the other node types. It has two Last Node references which are named True and False. These names were used for consistency with BranchNode terminology.

The generation of the control flow graph is performed by AST statements. Each AST statement implements a traverse method, which enables a statement to convert itself into one or more control flow graph nodes. This node then calls the traverse method on any dependents it may have which will convert them into control flow graph nodes, and then arranges them to represent the code flow. For example, in an "IF" construct, the condition statement generates a BranchNode and a MuxNode to represent the two branches of the "if" statement. The condition statement then passes each branch to the statements which will be executed in that branch. Those statements will in-turn add themselves to the control flow graph.

Instrumentation

In preferred embodiments, rather than directly modify the original code, the instrumentation system 30 includes a code regenerator 35 that uses the control flow graph of the static analysis data 25 and its associated abstract syntax tree to reverse engineer the abstract representation into source code. The regenerated code is functionally identical to the original code, but is different in two ways:
1. Statements which may have been on the same line in the original code are put on their own line
2. A function call is placed at key places within the code—these are the calls which generate markers (stored in a marker record) when the program is run. The placement of marker calls is discussed below.

Importantly, the code regeneration process also augments the AST by inserting line-number attributes at each statement; later on this allows cross referencing between the regenerated source code and the original source code. An alternative would be to write, as the code was regenerated, mapped line numbers into a file.

Separation of the code so that multiple statements on a single line are separated is helpful because it can be ensured that the errors reported apply to unique statements. Without such action, it would not necessarily be possible to give an accurate indication of the real problem if the problematic line referenced multiple statements.

As the regenerated code is produced, marker nodes are inserted into the code. Subsequently, when the code's control flow graph is produced, these nodes appear as decision points in the control flow graph. An example of original and regenerated code is illustrated in FIG. 5.

Preferably, it is the regenerated code that is submitted to dynamic analysis system 60. An example dynamic analysis system is the Valgrind system.

In order to know the exact execution path of the code under test, markers are generated (and preferably written to a dedicated file or database) when the regenerated source code is run (in this case under dynamic analysis control). In one embodiment, the markers are each unique and alphanumerically coded. The numeric part of the marker is unique and preceded by a 'F' or 'C'. 'F' is used for markers left immediately before a function call, 'C' markers are left within the branch of a conditional statement (such as an if . . . else).

In the embodiment illustrated, the markers encountered during execution are saved sequentially to a file (the marker record 70 of the embodiment of FIG. 1) with a .crumbs extension as the program executes. An example crumbs file is shown below in table 1:

TABLE 1 cat example4.regen.crumbs
F2
F1
F3
F4
F5
C6
F8

In this example, marker F2 is encountered first, followed by F1 etc. The final marker encountered (before the program completed or an error was thrown) is F8. The markers themselves do not give any indication as to why the sequence ends in this manner.

As discussed above, marker trigger code placed in the compiled code causes the corresponding marker to be recorded in the marker record. Optionally, after writing, the marker record write buffer may be flushed. This avoids markers being lost if the program should crash—a reasonable precaution since the type of code likely to be tested is likely to be unstable and susceptible to crashing.

It is important to note that marker calls are not necessarily placed at every statement in the source code. Apart from being unnecessary, it wastes resources; bearing in mind that each marker call in the code generates a marker node (with its associated attributes) which has to be stored in the AST as well as the marker trail itself in the resultant crumbs file. It will also be appreciated that placing marker calls at every statement would not scale to full size commercial code bases.

Marker trigger code is preferably placed at key decision points within the code, that is, within a branch of conditional statements ('C' marker) and before function calls ('F' markers). In other words marker nodes in a control flow graph determine the points during post-execution analysis by the system 40 where we need to consult the marker record to decide which way to go to follow the executed route.

Effectively, for conditions, the idea of the marker is to label a branch of execution. We could have equally validly placed the marker at the top of the branch but this would have meant more work finding the marker as we would have had to look at all the nodes in between the MUX node and the marker node to find out which one it is. By placing marker nodes where they are, we know that a marker node always precedes a MUX node making it much easier to find.

In a similar way, marker nodes are also placed before all function calls. Whilst this may not be that useful for intrinsic functions such as printf and malloc (as we are rarely interested in—or navigating back from—their internals), it is useful for tracking back through code which has executed (branched) over inter-procedural boundaries. For example, whilst tracking back we find ourselves at a function definition node (the top of the current function), but we know that there are more markers to be followed (i.e., those that have not been picked up from the .crumbs marker trail file). In this case we need to find the function that called the function we are currently in. Without a dropped marker in the calling function we couldn't possibly know where it was.

In summary, marker nodes are signposts and the marker trail is our route; in conjunction with the marker trail, they are used like a dot-to-dot puzzle to navigate the entire execution path taken through the code. Preferably, we only drop a marker at a fork in the road when the return path is ambiguous.

For further applications, which require forward as well as back tracing, more marker AST nodes (with associated marker calls in the regenerated code) could be placed at the beginning of conditional statements; it is only because the described embodiments seek to track back from a point of failure that nodes are placed where they are (as the final action within a conditional statement group).

Post-Execution Analysis

As discussed with reference to FIG. 1, the post-execution analysis system 40 is arranged to interface with the dynamic analysis system 60 and is operative to process the results of the dynamic analysis system 60 in conjunction with the marker record 70 and static analysis data 25.

The analysis performed by the post-execution analysis system 40 includes back tracking through code from an identified (by the dynamic analysis system 60) point of failure to identify the culprit of the failure.

Figure 6:
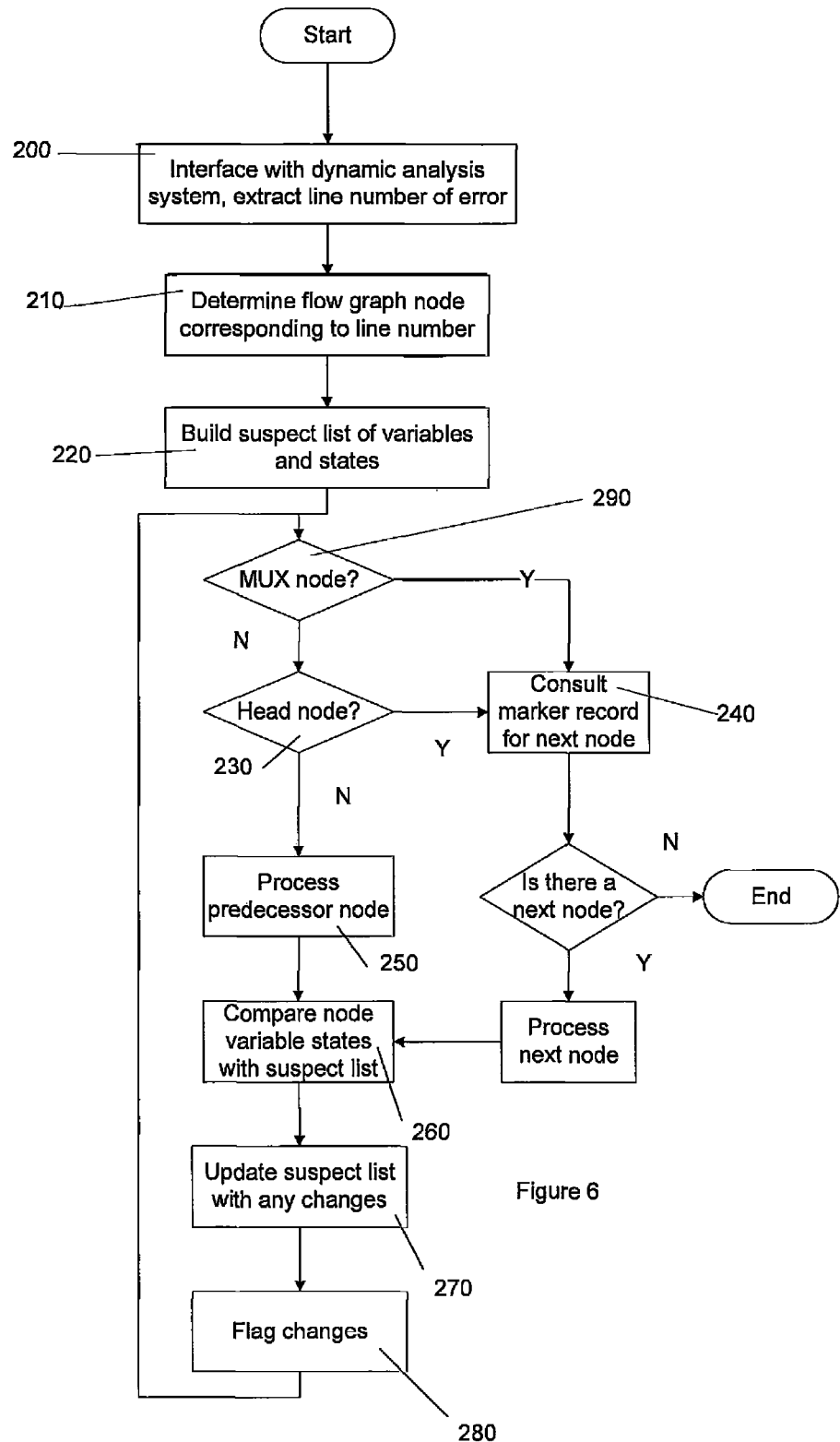
FIG. 6 is a flow diagram of operation of post-execution analysis in an embodiment of the present invention.

FIG. 6 is a flow diagram of the steps performed by the post-execution analysis system 40.

In step 200, the post-execution analysis system 40 interfaces with the dynamic analysis system 60 to obtain data on the error encountered. In the dynamic analysis system Valgrind, the dynamic_info_type class object gives the first clue as to where to start and what sort of problem was encountered. The post-execution analysis system 40 extracts the line number at which the error occurred from the object and uses it in step 210 to search the control flow graph in the static analysis data 25 to find the node in the control flow graph corresponding to the line number at which the error occurred.

At this point, the post-execution analysis system 40 accesses the marker record 70. If there are multiple marker records 70, these are concatenated in order of execution.

Having identified the start node in the control flow graph, the post-execution analysis system 40 begins processing. From this point on it deals exclusively with the marker record 70, the control flow graph and AST.

From the start node in the control flow graph (i.e., the place where the dynamic analysis system 60 found the original problem), a list of raw parameters is extracted. The dynamic analysis system 60 does not give an indication of which node parameter is at fault on a line of code. If there is more than one parameter, the post-execution analysis system 40 has to consider all of them as it analyses the code. A data structure called suspectList is built and maintained by the post-execution analysis system 40 to contain the suspect parameters.

FIG. 7 illustrates sample original code including a run time error and FIG. 8 is a screen shot showing output by a debugging system according to an embodiment of the present invention.

Consider the following example start point from line 43 of FIG. 7 (which is the statement with a problem reference in it):
   printf("*p_b=% d \n", *p_b, *p_x);

From this, the post-execution analysis system 40 builds a list of all variables (they are all suspect as it doesn't know which one is at fault). Literal variables (i.e., those surrounded by quotes) are not included in the final list. Before processing starts, the post-execution analysis system 40 calls a control flow graph support method for the 'state' of each variable in the suspect list at the node currently being considered. This information was previously obtained and stored in the static analysis data 25 by the static analysis system 20. All node parameters (which we will call variables from now on) together with their initial state information are added in step 220 to form a Python list. This results in a list of lists:
   [['*p_b', <stateA1.>], ['*p_x', <stateB1>]]

Next, the main process iteration starts. From the known start node, the post-execution analysis system 40 traverses the control flow graph backwards until it reaches a 'HEAD' node in step 230—this is the terminating condition. For these purposes, HEAD nodes always define the beginning of a function. If a HEAD node is reached and there is still further processing to do, the post-execution analysis system 40 must find out where to go next by consulting the next crumb in the marker trail record 70 in step 240. Analysis will continue backwards through calling functions until the marker trail dries up.

In a linear piece of code (i.e., that with no conditions in it), traversing the control flow graph is a straightforward matter. In this case there are no 'forks in the road' to consider. Given that the startNode has already been identified, the post-execution analysis system 40 can identify its predecessor by asking the current node for a pointer to the 'last' node. In this simple case the post-execution analysis system 40 simply sets the current node under test to be its predecessor in step 250. From this node backwards the post-execution analysis system 40 compares the current node state of each suspect variable with the state of each variable when it was last recorded in the suspectList in step 260. For each suspect variable, if the variable state is the same, the post-execution analysis system 40 passes over it and tests any remaining variables in the suspectList. If a variable's state has changed, the post-execution analysis system 40 stores the new state (replacing the existing one) in the suspectList in step 270 and flags that a suspect variable has gone from state X to state Y in step 280. The flag may be an output via a user interface; input to a software development environment; recordal to an error log; submission of an error to an automated error correction routine or any other action.

In the case of output via a user interface, instead of the identifying the location by a node id, the user is told of the line number associated with the node currently being analysed (as this information is held within the AST). Preferably, the line of code in question is highlighted to the user in dependence on the output by the post-execution analysis system 40.

Once all suspect variables have been processed, analysis continues with the next (i.e., previous) node in the control flow graph and so on, until the HEAD is reached in step 230. Ultimately the post-execution analysis system 40 will terminate when the marker list is exhausted.

In the example of FIG. 7, the code will compile even though line 43 is not syntactically correct (two parameters *p_x and *p_b but the printf statement only includes formatting for one). On getting the run-time error a naive programmer might hastily assume that the missing formatting parameter for printf was the cause, and remove *p_x from the printf statement (as it is unused). However, this is not the cause of the error and on the next run that the same error would occur.

In embodiments of the present invention, all variables and their states are considered (including *p_x which even though not used will still be processed) and it is identified that *p_b is the source of the error as illustrated in FIG. 8. By using an embodiment of the present invention, the system has obtained an understanding of the code and variable states that conventionally would not be possible and has resulted in identification of an error which is again to a degree of precision that has previously been impossible.

In the case of non linear code, a 'MUX' node (i.e., one that merges branches) will be encountered at some point during backtracking. This is dealt with at step 290. This presents the post-execution analysis system 40 with a choice of which way to go. At this point (at the MUX node) the post-execution analysis system 40 consults the marker trail file 70 in step 240 to determine which branch was taken during execution and should be followed in backtracking.

It can be seen that the debugging system has:
1) identified suspect variables;
2) tracked suspect variables' statically generated states back, identifying changes and flagging them (in this case by alerting the user);
3) in this example, identified a memory access problem with *p_b at line 40 even though is an alias of *p_a The resultant analysis output shown above only represents user messages; in addition to this, it can easily be made to show informational and debug output.

In conclusion, the illustrated embodiment has not only identified suspect variables associated with a runtime error, it tracks back their state to uncover the underlying problem whilst negotiating hurdles like pointer aliasing along the way.

Figure 9:
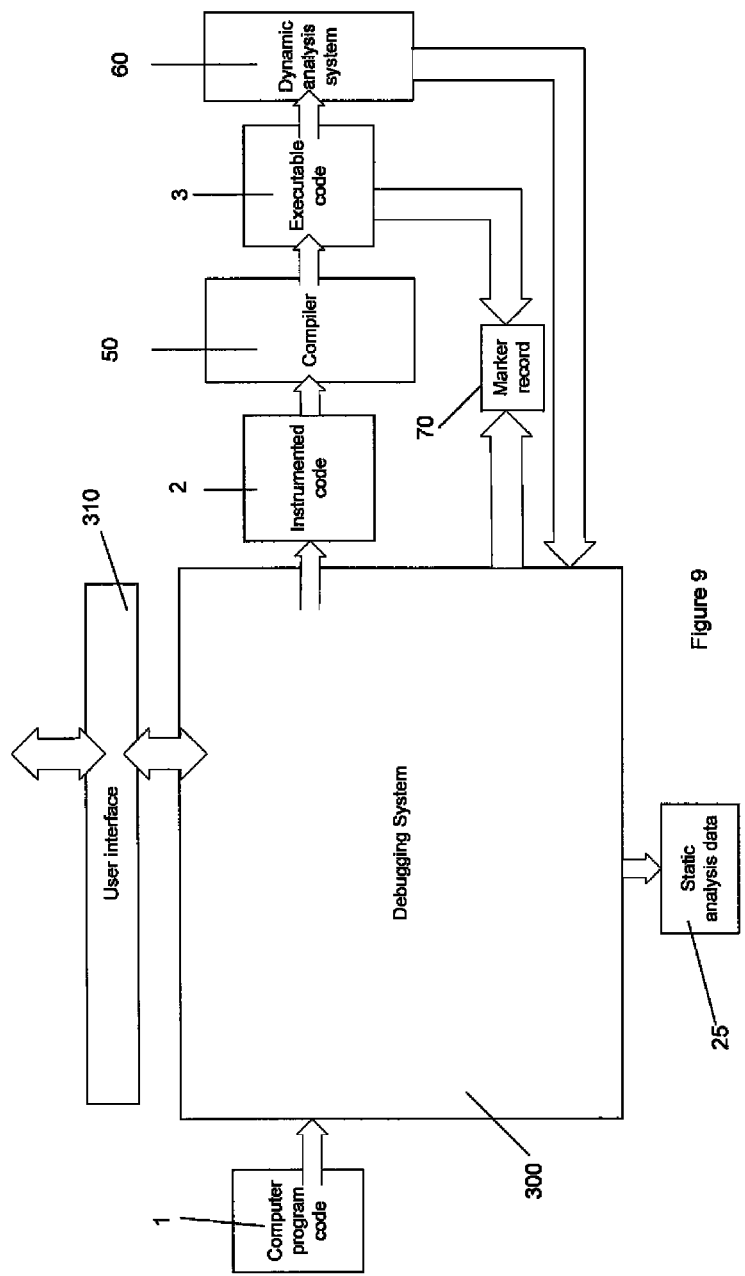

FIG. 9 is a schematic diagram of a preferred embodiment of the present invention. The embodiment of FIG. 9 operates in substantially the same manner as FIG. 1 and like features share common reference numerals.

In this particular embodiment, the static analysis system, instrumentation system and post-execution analysis system are integrated into a single system 300. With the exceptions discussed below, the system 300 functions in the same manner as that described with reference to FIG. 1. It will be appreciated that in both this embodiment and that of FIG. 1 that the various systems could be individual components or integrated into one or more components or systems. In a preferred embodiment, the system 300 is a plug-in that is arranged to interface with a software development environment such as Eclipse to take advantage of its compilation and dynamic analysis capabilities. In one embodiment, the system 300 may further include a user interface 310 for interacting with the user via the Eclipse (or indeed any other) environment. For example, the user interface 310 may be arranged to interface with code editing functionalities of the environment to highlight lines of code identified as problematic by the post-execution analysis system and/or submit the problematic code to an error correction routine.

In this embodiment, rather than alphanumeric markers, binary coded markers are used and compression techniques are applied by the instrumentation component of the system 300 in determining the markers used and their placement. The compression techniques are applied in dependence on the static analysis data 25.

Without the static analysis data 25, it would be possible to provide some compression of trace statements. However it would not be possible to know which paths are unreachable and so combinations will have markers assigned which are not possible. For example in the following code fragment there are only two possible local paths:

```
if(a == b)
{  f1(a, b); }
```

If we look inside f1, we see that there are two possible paths inside f1 also:

```
void f1(int a, int b)
{  if(a == b)
   {  f2(); }
}
```

Existing tracing systems would resolve this to four separate paths since they would instrument each of the branches separately. However aided by the static analysis data 25, the instrumentation component of the system 300 can compress these four possibilities down to two (the IF statement in f1 would never be encountered if a did not equal b therefore there would be a branch where f1 and f2 were called and a branch where neither were called). In a similar vein to the above example, run length encoding can be applied to loops based on the knowledge of code contained within the loops. Such encoding would not be possible without static analysis of the code contained inside the loop.

In order to compress markers, as discussed above, markers are binary coded (markers should be able to be encoded within a byte or less in most situations).

When regenerating code from the control flow graph, the regeneration component of the system 300 examines all branch points to ascertain if they are "leaves", that is, branch points which contain no further branches beneath them.

For each leaf branch point, the regeneration component determines the number of branches.

For each leaf branch point, the containing branch points are determined (i.e. the branch points which must be traversed in order to reach that leaf branch point) and possible combinations of leaf branches are calculated.

Loop branch points are identified by the regeneration system and analysed to allow run-length encoding to be applied where possible. For example, if a loop is run 1000 times, a run length encoding of markers for the 1000 loops can be produced and used as a marker.

From the obtained information, the minimum compressed marker size is calculated by the regeneration system (i.e. the corresponding number of bits needed to record which branch has been taken).

Further compression is possible if the regeneration component in combination with the static analysis data 25 can predict which branches will be selected most frequently—in that case Huffman coding of the various branch possibilities will compress the markers further.

The system 300 then assigns the determined binary coded compressed markers to the relevant branches and processing proceeds as discussed with reference to FIG. 1.

It will be appreciated that the control flow graph is only one notation for providing a language independent representation of computer program code that can be analysed and traced for execution routes. The use of control flow graphs, while preferable is not essential and the skilled reader will appreciate that other notations and techniques would also apply. Likewise, the skilled reader will appreciate that systems arranged as described herein execute code within a processor of a machine and that the execution of such code arranges, i.e., configures, the processor to perform the functions outlined in the text above.

The invention claimed is:

1. A computer implemented method of automatically debugging computer program code, comprising:
   generating static analysis data on computer program code for the computer system, the static analysis data including information on behaviors of the computer program code when executed, wherein the step of generating static analysis data includes generating a control flow graph for the computer program code and mapping data mapping nodes of the control flow graph to an associated line of the computer program code;
   instrumenting the computer program code by generating the instrumented computer program code from the control flow graph and inserting marker triggers into the computer program code,
   wherein the marker triggers are configured to generate a marker associated with each of a number of predetermined points in the computer program code that is reached during execution of the computer program code, each marker comprising a binary code and being uniquely identifiable, wherein the points are determined in dependence on the static analysis data;
   determining a compression scheme from the static analysis data, wherein the binary code for each marker is generated in dependence on the determined compression scheme and wherein determining the compression scheme includes the steps of:
   examining each branch point in the control flow graph to identify leaf points, a leaf point comprising a branch point which contain no further branch points beneath them;
   for each leaf point, identifying the number of branches;
   for each leaf branch point, identifying the parent branch points within the control flow graph which must be traversed in order to reach that leaf branch point; and
   calculating a minimum marker size in dependence on the number of leaf point and parent branches, the minimum marker size comprising the corresponding number of bits needed to record which branch has been taken;
   processing data on a run-time error produced by execution of said instrumented computer program code, the generated markers and the static analysis data configured to identify the source of the run-time error;
   wherein the step of instrumenting comprises:
   assigning a unique binary code marker to each leaf point and parent branch, the binary code marker being of the calculated minimum marker size.

2. A method according to claim 1, wherein at least one predetermined point comprises a branch in a path of the computer program code that would be reached during execution of the computer program code.

3. A method according to claim 2, wherein each uniquely identifiable marker comprises a code selected to uniquely differentiate the branch from other branches.

4. A computer implemented method of automatically debugging computer program code, comprising:
   generating static analysis data on computer program code for the computer system, the static analysis data including information on behaviors of the computer program code when executed, wherein the step of generating static analysis data includes generating a control flow graph for the computer program code and mapping data mapping nodes of the control flow graph to an associated line of the computer program code:
   instrumenting the computer program code by generating the instrumented computer program code from the control flow graph and by inserting marker triggers into the computer program code, the marker triggers being configured to generate a marker associated with each of a number of predetermined points in the computer program code that is reached during execution of the computer program code, each marker being uniquely identifiable and the points being determined in dependence on the static analysis data; and,
   processing data on a run-time error produced by execution of said instrumented computer program code, the generated markers and the static analysis data configured to identify the source of the run-time error, wherein the step of processing data on a run-time error comprises:
   using the data on the run-time error in combination with the mapping data to identify the node in the control flow graph corresponding to the point at which the run-time error occurred;
   building, from the static analysis data, a record of variables and their states which are associated with the identified node;
   traversing up the control flow graph to the head node including at each node traversed;
   comparing, using the record of variables and states and the static analysis data, states of the variables in the record with the states of the respective variables at the current node; and updating the record for the variable and flagging a change to the variable if the variable state at the current node differs from the variable state in the record, wherein if the current node branches up the control flow graph in two or more directions, the method further comprising determining the branch to traverse in dependence on the generated markers.

5. A method according to claim 4, wherein each marker comprises a binary code, the method further comprising length encoding the binary codes for loops within the computer program code.

6. A method according to claim 5, further comprising generating the binary code for each marker in dependence on a compression scheme determined from the static analysis data.

7. A method according to claim 5, wherein at least one predetermined point comprises a branch in a path of the computer program code that would be reached during execution of the computer program code.

8. A method according to claim 6, wherein at least one predetermined point comprises a branch in a path of the computer program code that would be reached during execution of the computer program code.

9. A method according to claim 8, wherein each uniquely identifiable marker comprises a code selected to uniquely differentiate the branch from other branches.

10. A method according to claim 7, wherein each uniquely identifiable marker comprises a code selected to uniquely differentiate the branch from other branches.

11. A method according to claim 4, wherein at least one predetermined point comprises a branch in a path of the computer program code that would be reached during execution of the computer program code.

12. A method according to claim 11, wherein each uniquely identifiable marker comprises a code selected to uniquely differentiate the branch from other branches.

\* \* \* \* \*